US010146699B2

(12) United States Patent
Lillibridge et al.

(10) Patent No.: US 10,146,699 B2
(45) Date of Patent: Dec. 4, 2018

(54) MAPPING APERTURES OF DIFFERENT SIZES

(71) Applicant: Hewlett Packard Enterprise Development LP, Houston, TX (US)

(72) Inventors: Mark David Lillibridge, Mountain View, CA (US); Paolo Faraboschi, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 4 days.

(21) Appl. No.: 15/500,576

(22) PCT Filed: Apr. 30, 2015

(86) PCT No.: PCT/US2015/028418
§ 371 (c)(1),
(2) Date: Jan. 31, 2017

(87) PCT Pub. No.: WO2016/175814
PCT Pub. Date: Nov. 3, 2016

(65) Prior Publication Data
US 2017/0220483 A1    Aug. 3, 2017

(51) Int. Cl.
*G06F 12/02* (2006.01)
*G06F 12/1036* (2016.01)
*G06F 12/0804* (2016.01)

(52) U.S. Cl.
CPC ........ *G06F 12/1036* (2013.01); *G06F 12/023* (2013.01); *G06F 12/0292* (2013.01);
(Continued)

(58) Field of Classification Search
CPC ............ G06F 12/1036; G06F 12/0804; G06F 2212/1016; G06F 2212/1041; G06F 2212/657
See application file for complete search history.

(56) References Cited

U.S. PATENT DOCUMENTS 5,649,142 A * 7/1997 Lavelle ............... G06F 9/30072
711/202
5,860,079 A    1/1999 Smith et al.
(Continued)

FOREIGN PATENT DOCUMENTS

| WO | WO-2013052061 | 4/2013 |
| WO | WO-2013052061 A1 | 4/2013 |
| WO | WO-2014092551 | 6/2014 |

OTHER PUBLICATIONS

"3D-Flashmap: A Physical-location-aware Block Mapping Strategy for 3D NAND Flash Memory" ~ 2011 ~ 6 pages.
(Continued)

*Primary Examiner* — Eric Cardwell
(74) *Attorney, Agent, or Firm* — Hewlett Packard Enterprise Patent Department

(57) ABSTRACT

Apertures of a first size in a first physical address space of at least one processor are mapped to respective blocks of the first size in a second address space of a storage medium. Apertures of a second size in the first physical address space are mapped to respective blocks of the second size in the second address space, the second size being different from the first size.

18 Claims, 9 Drawing Sheets

(52) U.S. Cl.
CPC .. *G06F 12/0804* (2013.01); *G06F 2212/1012* (2013.01); *G06F 2212/1016* (2013.01); *G06F 2212/1041* (2013.01); *G06F 2212/302* (2013.01); *G06F 2212/455* (2013.01); *G06F 2212/657* (2013.01)

(56) References Cited

U.S. PATENT DOCUMENTS

| | | | |
|---|---|---|---|
| 6,128,711 A * | 10/2000 | Duncan | G06F 12/0835 |
| | | | 711/119 |
| 6,349,380 B1 | 2/2002 | Shahidzadeh et al. | |
| 2006/0143411 A1 | 6/2006 | O'Connor | |
| 2007/0143568 A1 | 6/2007 | Gould | |
| 2011/0004739 A1 | 1/2011 | Hohmuth et al. | |
| 2011/0087846 A1 | 4/2011 | Wang et al. | |
| 2011/0219208 A1 | 9/2011 | Asaad et al. | |
| 2012/0147865 A1 * | 6/2012 | Pothula | G01C 21/3461 |
| | | | 370/338 |
| 2013/0339659 A1 | 12/2013 | Bybell et al. | |
| 2014/0040577 A1 | 2/2014 | Gheith et al. | |
| 2014/0089451 A1 | 3/2014 | Eran et al. | |
| 2014/0250274 A1 * | 9/2014 | Gostin | G06F 13/16 |
| | | | 711/141 |
| 2014/0258604 A1 * | 9/2014 | Asnaashari | G06F 12/0638 |
| | | | 711/104 |
| 2014/0281256 A1 | 9/2014 | Duluk, Jr. et al. | |
| 2015/0081999 A1 | 3/2015 | Wolrich et al. | |

OTHER PUBLICATIONS

International Searching Authority, The International Search Report and the Written Opinion, PCT/US2015/028415, Feb. 23, 2016, 13 Pages.

Michael Kerrisk, "Supporting Variable-Sized Huge Pages," Jan. 23, 2013, pp. 1-4 (online), Eklektix, Inc., Retrieved from the Internet on Sep. 14, 2018 at URL: <web.archive.org/web/20130212050241/https://lwn.net/Articles/533499/>.

Office Action, EP Application No. 15890946,5, dated Jul. 30, 2018, pp, 1-8, EPO (including attorney generated mapping of IDS (D1 to D11) to specific references, p. 9).

* cited by examiner

MAPPING APERTURES OF DIFFERENT SIZES

BACKGROUND

A system can include a processor that is able to access data stored in a storage medium. The processor can provide an address as part of a request to access the storage medium, where the address can correspond to a storage location of the storage medium.

BRIEF DESCRIPTION OF THE DRAWINGS

Some implementations of the present disclosure are described with respect to the following figures.

DETAILED DESCRIPTION

Figure 1:
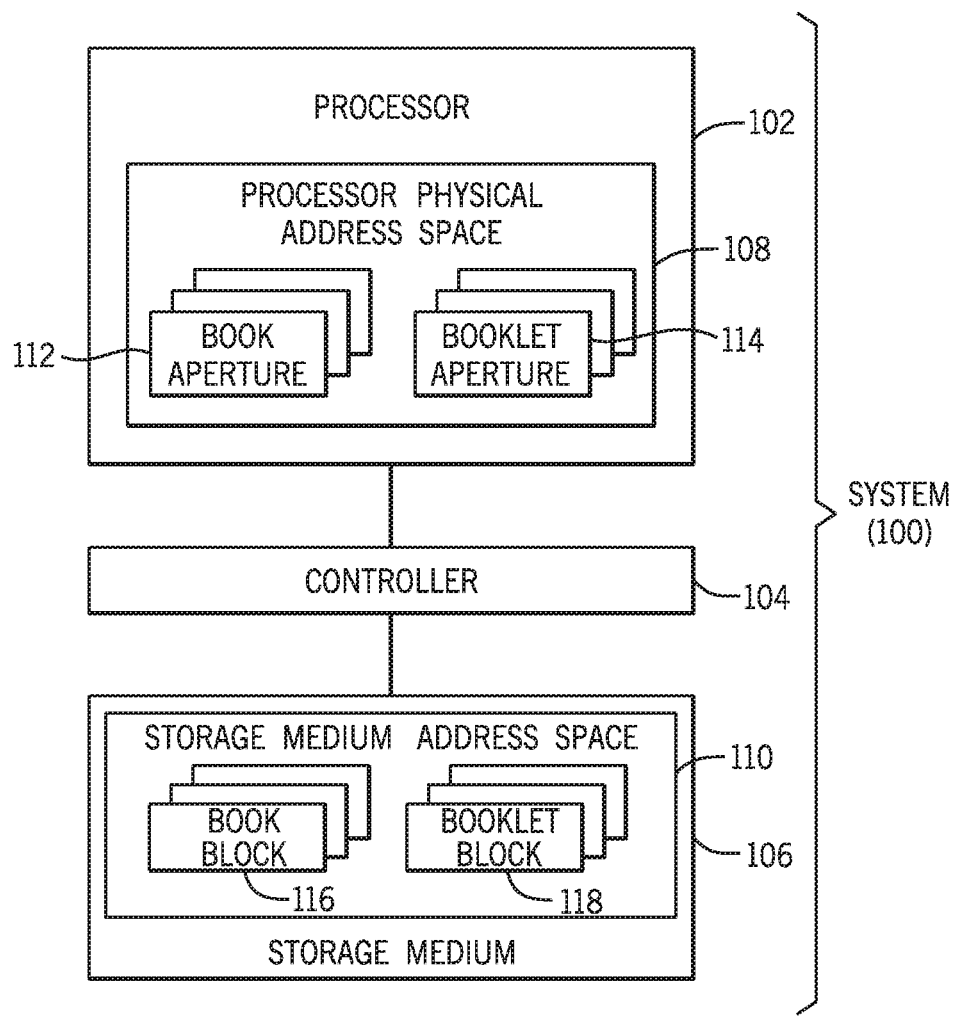
FIG. 1 is a block diagram of an example arrangement of a system, according to some implementations.

Some processors make use of both virtual and physical addresses. In these processors, a physical address is a memory address used to access memory outside of themselves. When a processor wants to access memory, the processor places a physical address on a memory bus or sends the physical address to a memory controller. The set of all physical addresses allowed makes up a physical address space of the processor. The internal buses and registers of a processor provide only a fixed number of bits for each physical address and thus that processor can only address so many distinct physical addresses.

Virtual addresses, by contrast, are abstractions that map internally to physical addresses. By using various virtual memory techniques, each running process in a system is given its own virtual address space, where the same virtual address in different processes can map to different physical addresses. Moreover, to allow the virtual address space to be bigger than the processors physical address space, some virtual addresses may temporarily be mapped to no physical address. Access by a process of one of these addresses (that are mapped to no physical address) results in a page fault, allowing an operating system (OS) to: (1) page in the underlying data from a storage disk (or other persistent storage) to physical memory, (2) change the virtual address to map to where the OS put the paged-in data, and (3) then resume the process, which then successfully repeats the access.

As used here, the term "processor" can refer to any electronic component in a system that is able to issue a request for accessing data of a storage medium. For example, a processor can include a microprocessor, a microcontroller, an application-specific integrated circuit (ASIC) device, a field programmable gate array (FPGA), an input/output (I/O) device (e.g., a network interface controller, a graphics controller, etc.), or another electronic component.

A storage medium can have an address space that is larger than the physical address space accessible by the processor. In such a scenario, some of the storage medium may be inaccessible by the processor unless some form of dynamic translation between the physical addresses of the processor and the address space of the storage medium (a so-called extended memory address space) is used. The present disclosure describes various techniques to perform this translation.

A storage medium can refer to one or multiple storage devices (or portions of the one or multiple storage devices), including memory devices (such as dynamic random access (DRAM) memory devices, static random access memory (SRAM) devices, flash memory devices, memristor memory devices, phase change memory devices, spin-transfer torque memory devices, etc.) and/or other types of storage devices.

In accordance with some implementations of the present disclosure, to extend the amount of storage available to a processor, mappings between apertures in a processor-accessible physical address space (also referred to as "processor physical address space") and respective blocks in the address space of the storage medium (also referred to as "storage medium address space" or "extended memory address space") can be provided. By using such mappings, the processor can access a word in the storage medium, even if the range of addresses of the word is outside the processor physical address space. A "word" can refer to a data unit of some specified size.

The apertures in the processor's physical address space can be of multiple different sizes (e.g., apertures of a first size and apertures of a second size, where the second size is different from the first size). Although reference is made to apertures of two different sizes in the present discussion, it is noted that techniques or mechanisms according to some implementations are applicable to apertures of more than two different sizes.

An aperture can refer to a respective continuous range of addresses in the physical address space of the processor that can be mapped as a unit to a range of addresses of a storage medium. If the storage medium includes just a single storage device, then the storage medium address may just be the address used to address memory in that storage device (a so-called real address). Alternatively, the storage medium address may be a logical address. Examples where logical addresses may be used include arrangements in which the storage medium is constructed ("constructed storage medium") from multiple storage devices (or portions of multiple storage devices) that are combined such as by interleaving the multiple storage devices, or by arranging the multiple storage devices in a Redundant Array of Independent Disks (RAID) arrangement. Thus consecutive logical addresses of a storage medium may map to different real addresses belonging to different underlying storage devices. An aperture can be mapped as a unit to a continuous range of logical addresses of the constructed storage medium, where the continuous range of logical addresses can be represented by contiguous or non-contiguous ranges of real addresses of the underlying storage devices (or portions of devices) that form the constructed storage medium.

A block in the storage medium address space can refer to a respective range of addresses in the storage medium address space. In some examples, blocks of the storage medium of a given size do not overlap. In other examples, blocks of the same size may overlap so that apertures may be mapped to such overlapping blocks (that correspond to overlapping ranges of addresses). In the latter examples, note that although the ranges of addresses of respective blocks can overlap, this does not mean that apertures have to be mapped to overlapping blocks at the same time.

FIG. 1 is a block diagram of an example system 100 that includes a processor 102, a controller 104, and a storage medium 106. The controller 104 is to control access of the storage medium 106, in response to requests from the processor 102 or other requesting devices. The controller 104 receives requests from the processor 102 containing physical addresses and sends appropriately modified requests containing storage medium addresses onwards to the storage medium 106. In some examples, there may be additional processors 102, each connected to its own controller 104, with all of the controllers 104 connected to a single storage medium 106.

The storage medium 106 can be implemented with a storage device or with multiple storage devices (or portion(s) of the storage device(s)). A storage device can refer to a disk-based storage device, a solid-state storage device, a memory device, or any other storage device that is capable of storing data. In some examples, the storage medium 106 can be implemented with persistent storage device(s), where a persistent storage device refers to a storage device that maintains the data stored in the storage device even if power is removed from a storage device. In other examples, the storage medium 106 can include a volatile storage device, which loses its stored data if power is removed from the storage device.

The processor 102 is associated with a processor physical address space 108, and the storage medium 106 is associated with a storage medium address space 110. The processor physical address space includes physical addresses that are accessible by the processor 102. The storage medium address space 110 includes addresses at which data is stored in the storage medium 106. In some implementations, it is noted that the storage medium address space may be larger than the processor physical address space, so that the storage medium address space could not be directly physically addressed by the processor 102.

The processor physical address space 108 includes apertures 112 of a first size and apertures 114 of a second, different size, where the second size can be smaller than the first size. An aperture can refer to a continuous physical range of addresses in the processor physical address space 108 that can be mapped as a unit to a range of addresses of the storage medium 106 (in the storage medium address space 110). The range of addresses to which an aperture can be mapped can be a range of addresses of the storage medium 106.

The storage medium address space 110 includes blocks 116 of the first size and blocks 118 of the second size. The apertures 112 of the first size can be mapped to corresponding blocks 116 of the first size, while the apertures 114 of the second size can be mapped to corresponding blocks 118 of the second size. In some examples, blocks of a given size do not overlap. For example the storage medium 106 may be divided up into blocks of the first size. In some examples, blocks of the first size are made up of a multiple of blocks of the second size. For example, each block of the first size may be evenly divided up into 128 blocks of the second size. In such a case, a memory word can be accessed either through an aperture of the first size mapping to the block of the first size that word is contained in or through an aperture of the second size mapping to the block of the second size that word is contained in.

In the ensuing discussion, an aperture 112 of the first size is referred to as a book aperture, while an aperture 114 of the second size is referred to as a booklet aperture. Likewise, a block 116 of the first size is referred to as a book block and a block 118 of the second size is referred to as a booklet block.

In some implementations, the first size can be multiple (e.g. two or more) orders of magnitude larger than the second size. As an example, the first size can be at least 1 gigabyte (GB), while the second size can be a few kilobytes (KB). As a more specific example, a book aperture 112 can be 8 GB in size, while a booklet aperture 114 can be 4 KB in size. As another example, the second size is less than or equal to 1 megabyte (MB) and the first size is greater than or equal to 1 GB. Although specific values are used as examples of the sizes of the book aperture 112 and booklet aperture 114, it is noted that in other examples, other sizes of the book aperture 112 and booklet aperture 114 can be employed. In further implementations, the size of a booklet aperture 114 can be the size of a virtual page used by a system. A virtual page is a fixed-length contiguous block of virtual memory, described by a single entry in the page table. A virtual page is a unit of data (in some examples a smallest unit of data) for memory management in a virtual memory operating system.

The book apertures 112 and booklet apertures 114 can be used in different use cases. Book apertures 112 can be used in first use cases where data is accessed in stable "small" regions, where small means smaller than the size of the physical address space. An example may include a backing store for a small file system.

An example second use case can involve randomly accessing portions of a large region of a storage medium. Such random access can result in page faults (where a page that is being accessed is not currently directly accessible via a physical address, but has to be made accessible by changing an aperture mapping). For such second use cases, usage of the booklet apertures 114 would be more efficient, since a page fault involving a booklet aperture 114 may be addressed much faster than a page fault involving a book aperture 112.

In some implementations, a particular book aperture 112 can map to any block of extended memory (of the storage medium 106) of the first size. As an example, the particular book aperture 112 can start at physical address P, and can be mapped to the extended memory book block starting at address E. Thus, a store (write) to an address P+13 by the processor 102 translates into a store to address E+13 in the storage medium 106. Subsequently, if the particular book aperture 112 (starting at address P) is changed to map to extended memory starting at E', then the same store to P+13 can instead write to E'+13.

The mapping between booklet apertures 114 and respective blocks 118 of the storage medium 106 is similarly provided.

Figure 2:
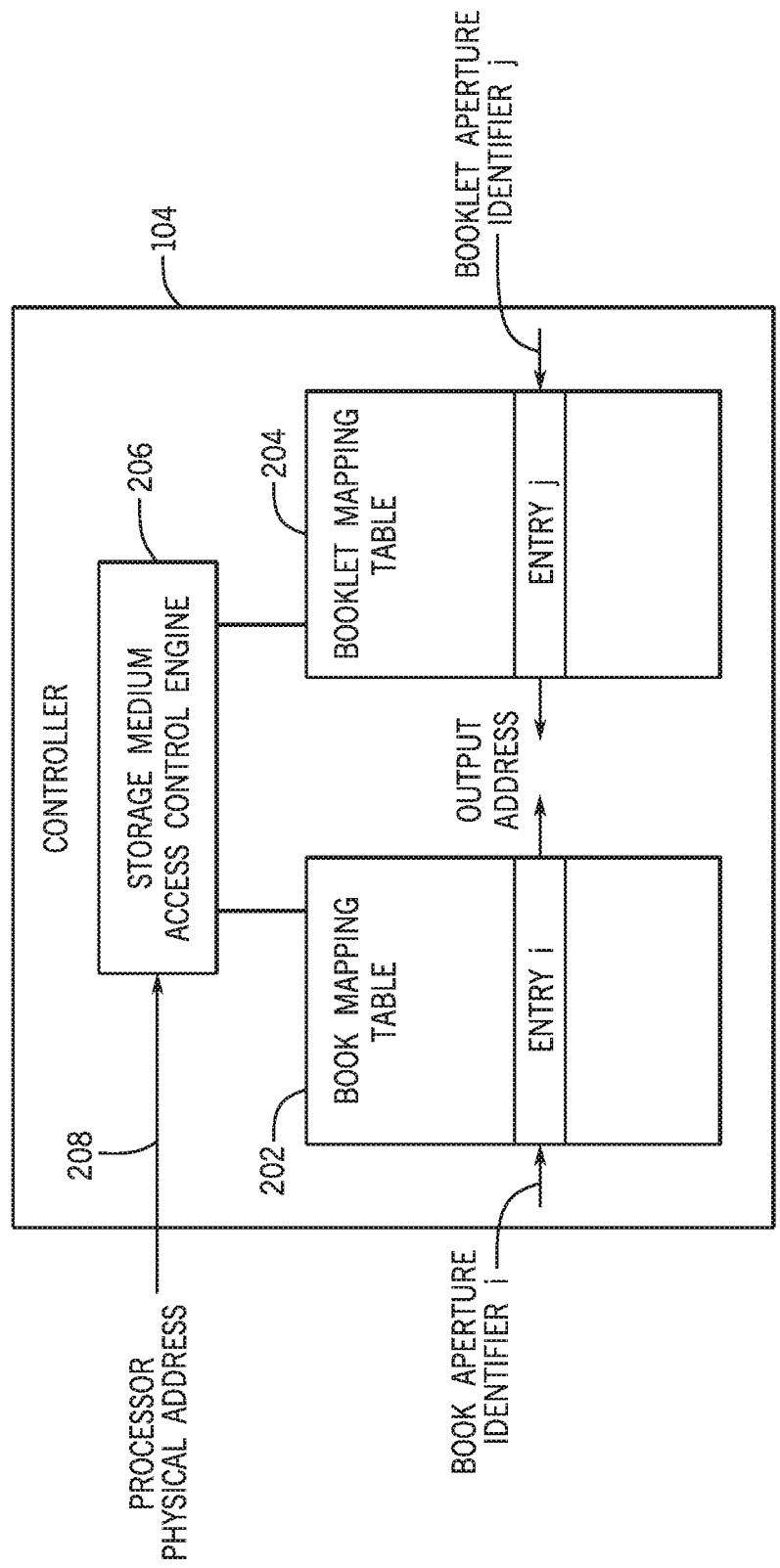
FIG. 2 is a block diagram of a controller according to some implementations.

FIG. 2 shows an example of components of the controller 104, according to some implementations. The controller 104 is associated with a book mapping table 202 and a booklet mapping table 204. In some examples, the controller 104 can include storage (e.g., memory, registers, SRAM, etc.) to store the book mapping table 202 and the booklet mapping table 204. In other examples, the storage storing the book mapping table 202 and booklet mapping table 204 can be located external to the controller 104. Moreover, although two separate mapping tables 202 and 204 are shown in FIG. 2, it is noted that in other examples, a common data structure that includes the content of the book mapping table 202 and the booklet mapping table 204 can be employed.

The book mapping table 202 includes entries that each maps a respective book aperture 112 (of the first size) to a respective block 116 of the storage medium 106 (of the first size). Each respective entry of the book mapping table 202 can be indexed by a respective book aperture identifier (e.g., book aperture number). For example, the book apertures 112 can be consecutively numbered from a first value to some upper value.

Each entry of the book mapping table 202 may include the starting address of the block 116 (of the storage medium 106) to which the respective book aperture 112 is mapped. As shown in the example of FIG. 2, book aperture identifier i indexes to entry i in the book mapping table 202. In the example discussed further above where a book aperture starts at physical address P, and maps to extended memory starting at address E, entry i in the book mapping table 202 contains address E. Alternative ways of specifying which book block 116 a book aperture 112 is mapped to may be used. For example, entry i may instead contain the ending address of book 116 or a book block offset into the storage medium.

The booklet mapping table 204 may similarly include multiple entries that can be mapped by booklet aperture identifiers (e.g., booklet aperture numbers), where each entry of the booklet mapping table 204 stores the starting address of a respective block 118 (of the second size) in the storage medium 106. As shown in FIG. 2, booklet aperture identifier j indexes to entry j in the booklet mapping table 204. The accessed entry i (of book mapping table 202) or entry j (of booklet mapping table 204) may output an address in the extended memory.

In some examples, the book mapping table 202 and booklet mapping table 204 can be stored in control registers (or other storage) that are exposed to the processor 102, such that the content of the book mapping table 202 and/or booklet mapping table 204 can be updated.

In some implementations, the content of the book mapping table 202 and the booklet mapping table 204 can be updated dynamically during operation of a system. In some cases, the book mapping table 202 is changed less frequently than the booklet mapping table 204 during operation of a system.

The controller 104 also includes a storage medium access control engine 206, which controls access (read and/or write) of the storage medium 106 in response to an access request from the processor 102, where the access request includes a processor physical address 208 that is in the processor physical address space (108 in FIG. 1).

The storage medium access control engine 206 can be implemented with hardware logic, such as hardware logic in an ASIC device, FPGA, and so forth. In other examples, the storage medium access control engine 206 can be implemented as a combination of hardware and machine-readable instructions (software or firmware), where the machine-readable instructions are executable on a processing circuit of the controller 104.

Figure 3:
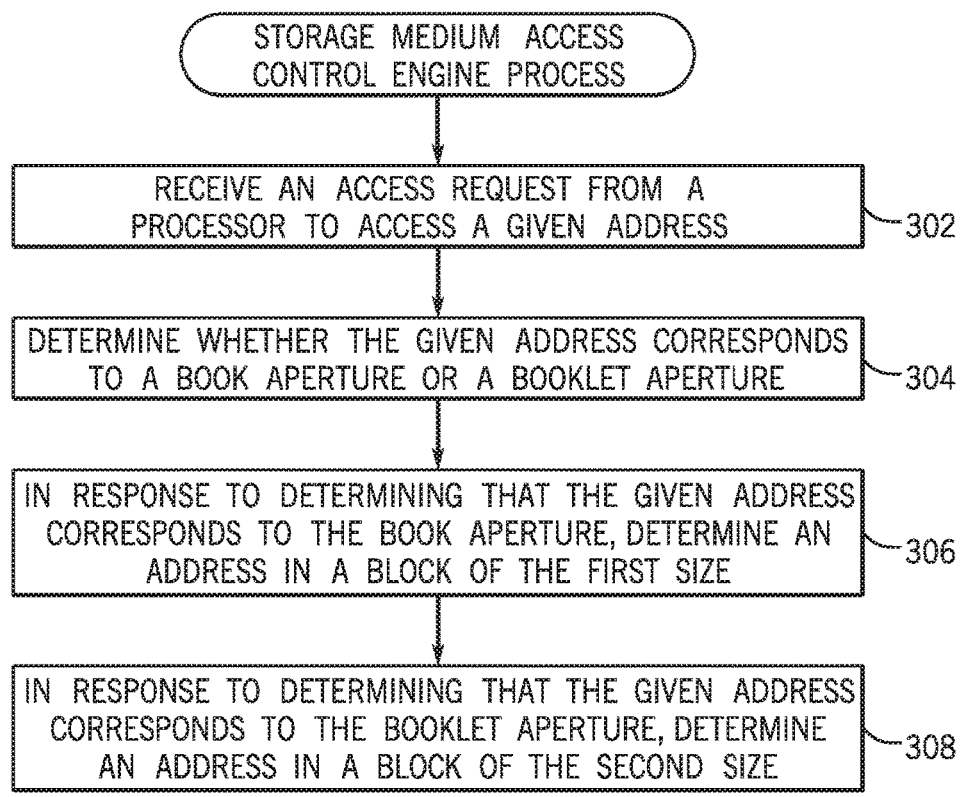
FIG. 3 is a flow diagram of a process of a storage medium access control engine, according to some implementations.

FIG. 3 is a flow diagram of a process that can be performed by the storage medium access control engine 206 according to some implementations. The storage medium access control engine 206 receives (at 302) an access request from the processor 102 to access a given address (208) in the processor physical address space. In response to the access request, the storage medium access control engine 206 determines (at 304) whether the given address corresponds to a book aperture 112 (of the first size) in the processor's physical address space, to a booklet aperture 114 (of the second size) in the processor's physical address space, or to something else. In an example, if the given address is in a first address range in the processor physical address space, then the given address corresponds to an access of a book aperture 112. However, if the given address is in a second, different address range in the processor physical address space, then the given address corresponds to an access of a booklet aperture 114.

In response to determining that the given address corresponds to a book aperture 112, the storage medium access control engine 206 determines (at 306) an address in a book block 116 (in the storage medium address space) mapped to the book aperture 112. The determining may be performed by accessing an entry of the book mapping table 202 (FIG. 2), and retrieving the address of the corresponding block 116 in the storage medium address space.

In response to determining that the given address corresponds to a booklet aperture 114, the storage medium access control engine 206 determines (at 308) an address in a booklet block 118 (in the storage medium address space) mapped to the booklet aperture 114. This determining (308) may be performed by accessing an entry of the booklet mapping table 204 (FIG. 2), and retrieving the address of the corresponding block 118 in the storage medium address space.

Figure 4:
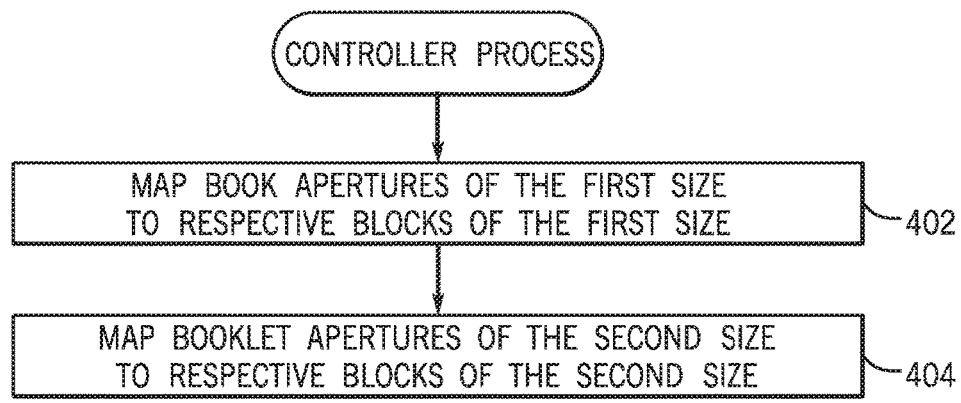
FIG. 4 is a flow diagram of a process of a controller, according to some implementations.

FIG. 4 is a flow diagram of a process performed by the controller 104 according to some implementations. The controller 104 maps (at 402) book apertures 112 of the first size in the processor physical address space of at least one processor (e.g., processor 102) to respective blocks 116 of the first size in the storage medium address space. The mapping (402) can be performed using the book mapping table 202 of FIG. 2, for example.

The controller 104 also maps (at 404) booklet apertures 114 of the second size (e.g., 114) in the processor physical address space to respective blocks 118 of the second size in the storage medium address space. The mapping (404) can be performed using the booklet mapping table 204 of FIG. 2, for example.

The following Table 1 provides an example pseudocode, WRITE_ADDRESS( ), for how the controller 104 may handle a processor 102 request for writing a data value ("value") to a given physical address ("address").

TABLE 1

```
1   WRITE_ADDRESS(address, value):
2       if address in the physical address range of book apertures:
3           aperture_offset = get_book_aperture(address)
4           byte_offset = get_byte_offset_within_book(address)
5           book_offset = book_mapping_table[aperture_offset]
6           EA = book_offset * BOOK_SIZE + byte_offset
7           DO_WRITE(EA, value)
8
9       if address in the physical address range of booklet apertures:
10          aperture_offset = get_booklet_aperture(address)
11          byte_offset = get_byte_offset_within_booklet(address)
12          # extract by bit fields:
13          book_offset, booklet_offset =
                booklet_mapping_table[aperture_offset]
14          EA = book_offset * BOOK_SIZE + booklet_offset *
                BOOKLET_SIZE
15              + byte_offset
16          DO_WRITE(EA, value)
17
18      if address in the physical address range of the book mapping
            table:
19          book_offset = value
20          entry = get_entry(address)
21          book_mapping_table[entry] = book_offset
22
23      if address in the physical address range of the booklet mapping
            table:
```

| | TABLE 1-continued |
|---|---|
| 24 | book_offset, booklet_offset = value |
| 25 | entry = get_entry(address) |
| 26 | booklet_mapping_table[entry] = book_offset, booklet_offset |
| 27 | |
| 28 | # remaining cases are not translated (e.g., I/O space) |

In the foregoing pseudocode, WRITE_ADDRESS( ) is an example of how to handle a request received to write "value" to a given address ("address") in the processor physical address space. At lines 2 and 9, the WRITE_ADDRESS( ) pseudocode determines whether the given address is in an address range for the book apertures 112 or in an address range for booklet apertures 114. In response to determining that the given address is in the address range for the book apertures 112, lines 3-4 of the WRITE_ADDRESS( ) pseudocode obtain, using the given address, an aperture identifier ("aperture_offset") that identifies a book aperture corresponding to the given address, and an offset ("byte_offset") within the identified book aperture. The value of "aperture_offset" is obtained by calling get_book_aperture (address), while the value of "byte_offset" is obtained by calling get_byte_offset_within_book(address).

For example, the get_book_aperture(address) routine can compute (address—FBA)/BOOK_SIZE, where FBA is the starting physical address of the book apertures 112 and the get_byte_offset_within_book(address) routine can compute (address—FBA) % BOOK_SIZE where % denotes the modulus operation.

Given the book aperture identifier ("aperture_offset") derived above, the offset ("book_offset" in the above pseudocode) of the respective block 116 in the storage medium address space is obtained at line 5 by calling book_mapping_table[aperture_offset], which accesses the book mapping table 202 (FIG. 2) to retrieve the content of the entry indexed by the aperture identifier ("aperture_offset").

At line 6, the address ("EA") in extended memory (the storage medium 106) is computed according to:

EA=book_offset*BOOK_SIZE+offset_byte, where BOOK_SIZE represents the first size (of a book aperture 112).

The address, EA, is the address in a block 116 in the storage medium address space to which data ("value") is written.

More generally, the WRITE_ADDRESS( ) pseudocode computes an address in the storage medium address space using the aperture identifier of the book aperture to which the given address maps, and the offset in that book aperture, where the computed address corresponds to a location in a block of the first size (block 116) in the storage medium address space.

Line 7 of the WRITE_ADDRESS( ) pseudocode then performs a write of the data ("value") to the address EA (which is an address in the storage medium address space), by calling DO_WRITE(EA, value). This generally involves sending a request to the storage medium containing address EA.

On the other hand, in response to determining that the given address is in an address range for the booklet apertures 114 (line 9 of the pseudocode above), lines 10-11 of the WRITE_ADDRESS( ) pseudocode obtain, using the given address, an aperture identifier ("aperture_offset") that identifies a booklet aperture 114 corresponding to the given address, and an offset ("byte_offset") within the identified booklet aperture. The value of "aperture_offset" is obtained by calling get_booklet_aperture(address), while the value of "byte_offset" is obtained by calling get_byte_offset_within_booklet(address).

Note that in some implementations, a booklet is included within a book. Thus, to write to a booklet, the offset of the book within which the booklet is included is also identified. The offset of the respective block 116 ("book_offset" in the above pseudocode) and the offset of the respective booklet 118 ("booklet_offset") are obtained at line 13 of the pseudocode by calling booklet_mapping_table[aperture_offset], which accesses the booklet mapping table 204 (FIG. 2) to retrieve the content of the entry indexed by the aperture identifier ("aperture_offset").

The address ("EA") in extended memory (of the storage medium 106) is computed (at lines 14-15 of the pseudocode) according to:

EA=book_offset*BOOK_SIZE+booklet_offset*BOOKLET_SIZE+offset_byte, where BOOKLET_SIZE represents the second size (of the booklet apertures 114). EA thus specifies an address within a block 118 of the second size that is included in a block 116 of the first size in the storage medium 106.

More generally, in response to determining that the given address is in an address range for the booklet apertures 114, the WRITE_ADDRESS( ) pseudocode computes an address in the storage medium address space using the aperture identifier of the booklet aperture and the offset in that booklet aperture.

Line 16 of the WRITE_ADDRESS( ) pseudocode then performs a write of the data ("value") to the address EA (which is an address in the storage medium address space), by calling DO_WRITE(EA, value).

In the foregoing example WRITE_ADDRESS( ) pseudocode, a write can also occur to the book mapping table 202 or the booklet mapping table 204. A write to a physical address range of the book mapping table 202 results in updating the corresponding entry of the book mapping table 202 (lines 18-21 of the pseudocode), while a write to an address in the physical address range of the booklet mapping table 204 results in a write to the corresponding entry of the booklet mapping table 204 (lines 23-26 of the pseudocode).

The pseudocode for reading a physical address that is within the address range of book apertures 112 or the address range of booklet apertures 114 can have similar logic as the logic for the WRITE_ADDRESS( ) pseudocode provided above, except instead of writing to address EA, a read is performed from address EA.

Figure 5A:
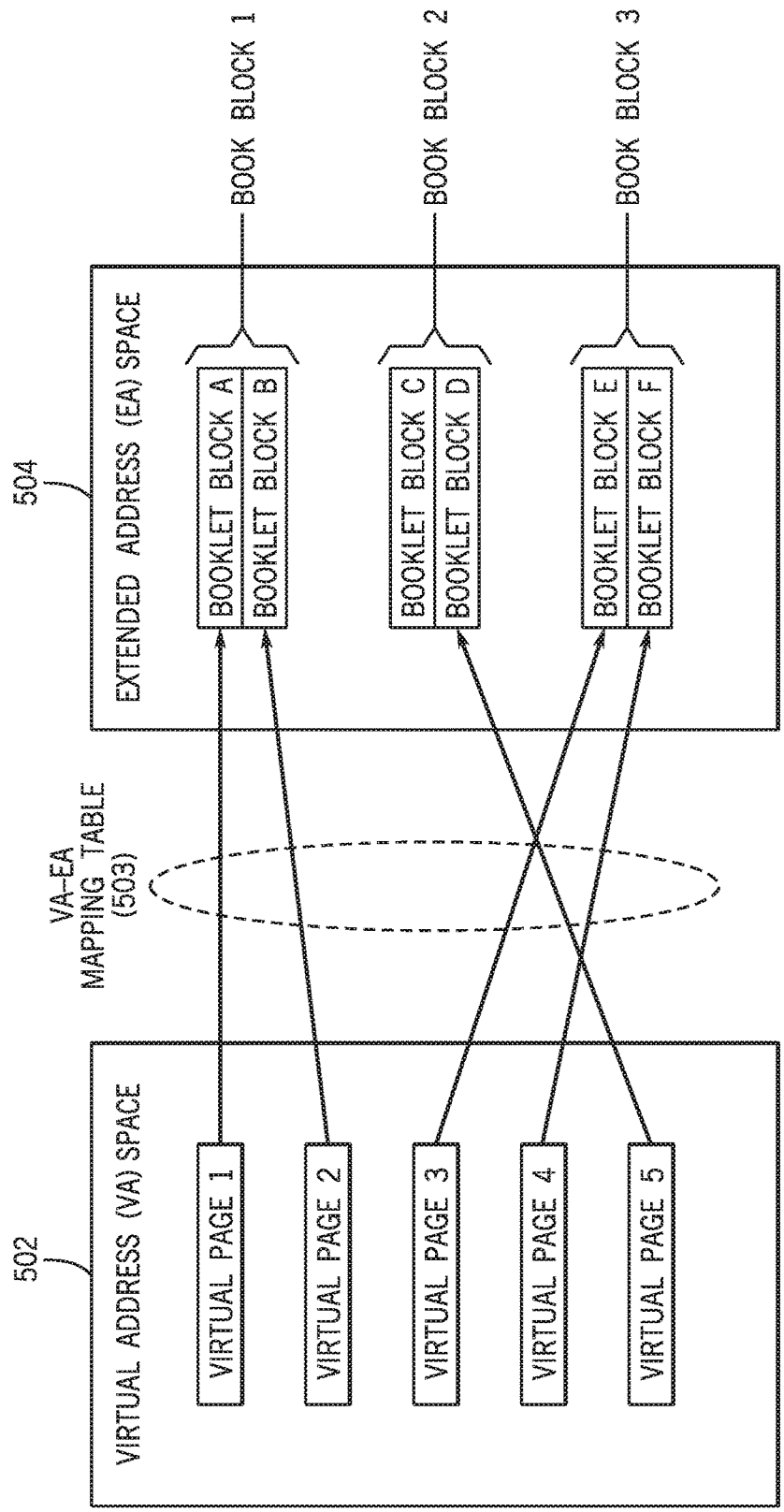
FIGS. 5A-5F illustrate example mappings according to some implementations.
Figure 5B:
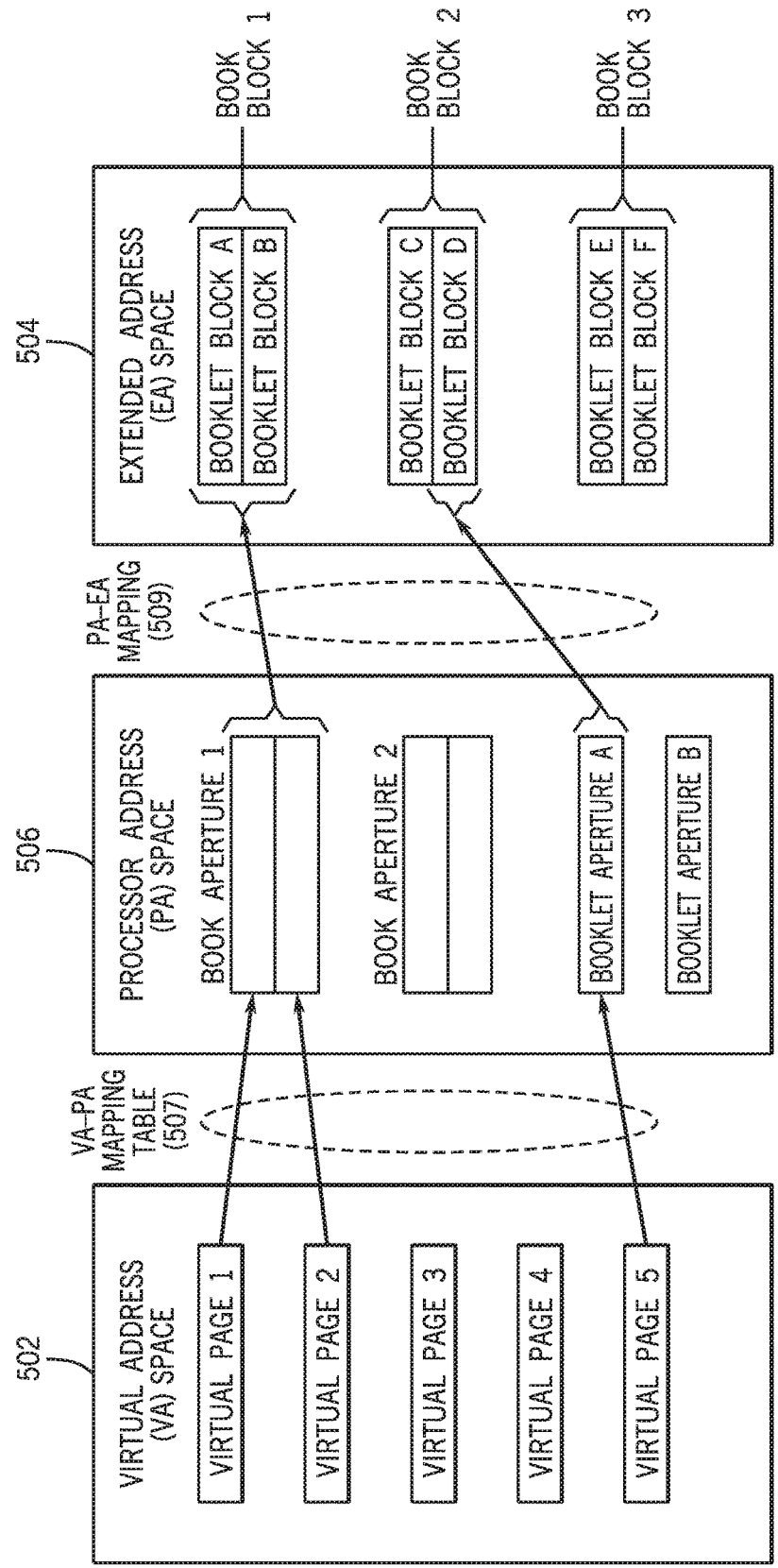
Figure 5C:
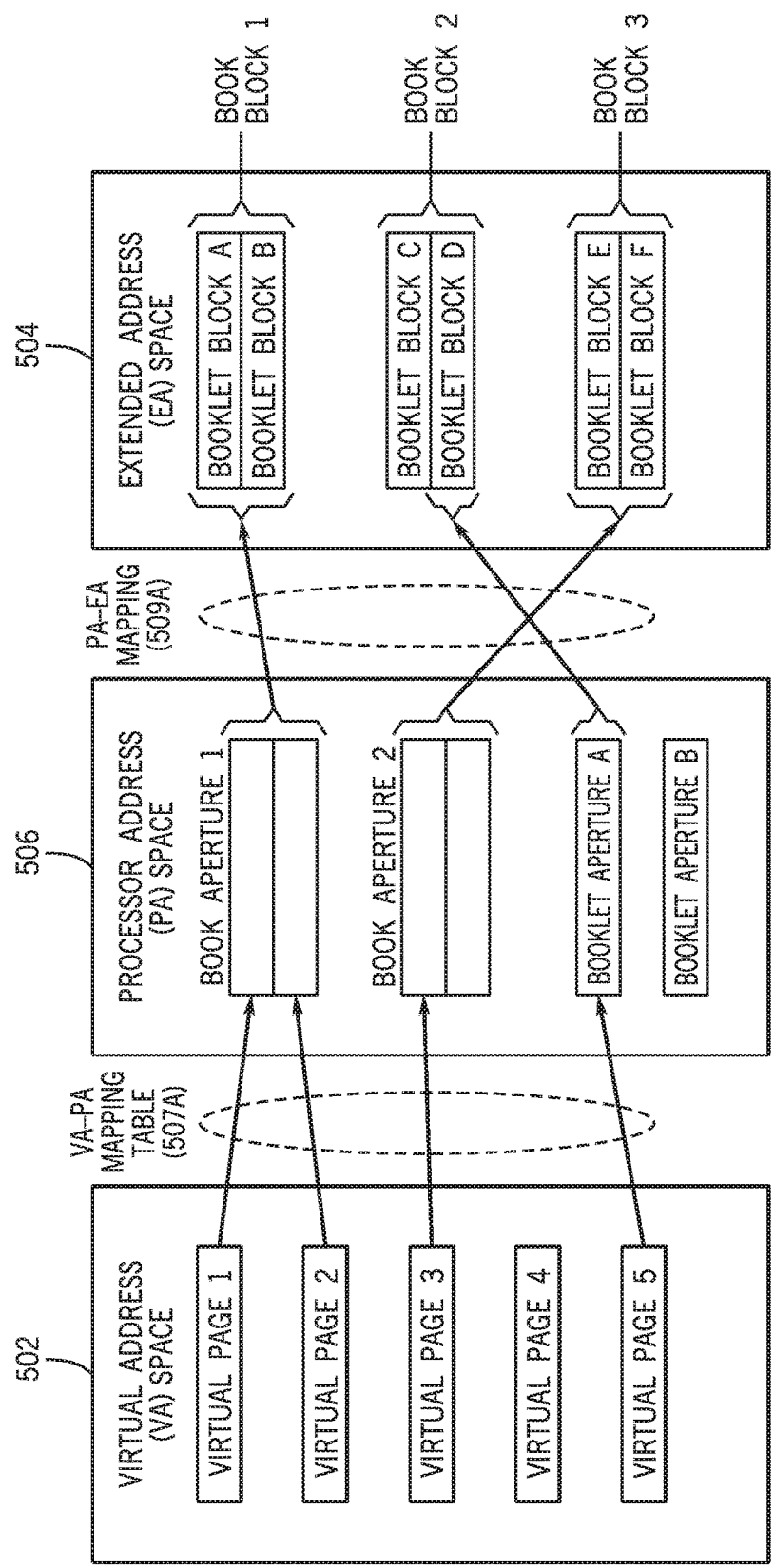

FIGS. 5A-5C show an example of how an operating system (OS) in a system (such as the system 100 of FIG. 1) can use the book apertures and the booklet apertures. FIG. 5A shows a mapping, as seen by a particular process, between a virtual address (VA) space 502 including virtual pages (virtual pages 1-5 shown in the example of FIG. 5A) and an extended address (EA) space 504 (which is an example of the storage medium address space 110 of FIG. 1). There can be multiple processes executing in the system, and each of the multiple processes can have its own mapping between its VA space and the EA space 504.

The virtual pages of the VA space 502 are used by the OS. In some examples, the mapping of FIG. 5A can be expressed by a VA-EA mapping table 503 (or other data structure). Each entry (of multiple entries) of the VA-EA mapping table identifies a respective virtual page and the corresponding booklet block that the respective virtual page is correlated with.

In the example of FIG. 5A, the VA-EA mapping table 503 maps virtual page 1 to booklet block A, maps virtual page 2 to booklet block B, maps virtual page 3 to booklet block E, maps virtual page 4 to booklet block F, and maps virtual page 5 to booklet block D. In the example of FIG. 5A, it is assumed that a book block is made up of two booklet blocks. Thus, book block 1 in the EA space 504 is made up of booklet blocks A and B, book block 2 is made up of booklet blocks C and D, and book block 3 is made up of booklet blocks E and F.

The VA-EA mapping represented by FIG. 5A is actually implemented by a combination of the following, as shown in the example of FIG. 5B: (1) a mapping between virtual pages of the VA space 502 and (portions of) apertures of a processor physical address (PA) space 506 (which is an example of the processor physical address space 108 of FIG. 1); and (2) a mapping between the apertures of the PA space 506 and the blocks of the EA space 504 (such as represented by the book and booklet mapping tables 202 and 204 of FIG. 2). The mapping between the VA space 502 and the PA space 506 can be represented by a VA-PA mapping table 507 (or other data structure). Each entry (of multiple entries) of the VA-PA mapping table 507 may identify a respective virtual page and the corresponding aperture (portion) that the virtual page is correlated with, if any.

In the example of FIG. 5B, it is assumed that there are two book apertures, book aperture 1 and book aperture 2. Each book aperture is of the first size and contains two halves, each of the second size. FIG. 5B also shows booklet apertures A and B. The VA-PA mapping table 507 maps virtual page 1 to the first half of book aperture 1, maps virtual page 2 to the second half of book aperture 1, and maps virtual page 5 to booklet aperture A.

In the example of FIG. 5B, a PA-EA mapping (509) maps book aperture 1 to book block 1, and maps booklet aperture A to booklet block D. The mapping (509) can be implemented with the book mapping table 202 and booklet mapping table 204 of FIG. 2, for example.

At any given time, due to physical address space constraints of the processor 102, only so many extended pages (each extended page corresponding to a book block or booklet block of the EA space 504) are "paged into" the PA space 506. A block being "paged into" the PA space 506 refers to that block being addressable using an aperture of that PA space using the current aperture mappings. A block that is not "paged into" the PA space 506 is not addressable using any aperture of that PA space using the current aperture mappings. In FIG. 5B, some of the blocks (e.g., book block 3 and booklet blocks C, E, and F) are not paged into the PA space 506.

The blocks of the EA space 504 that are not paged into the PA space 506 (the "paged out" blocks) are inaccessible using any aperture until such blocks are paged into the PA space 506. An attempted access to a block of the EA space 504 that is paged out results in a page fault as the virtual memory page in question is not currently mapped to any physical address.

The OS uses virtual addresses (which are addresses in virtual pages) to access data. Such virtual addresses are translated to physical addresses for accessing locations of the storage medium 106. As an example, suppose a virtual address V is meant to be backed by extended address E (of a given block in the EA space 504) but currently no aperture maps to the given block and thus the virtual address V points nowhere. An access to the virtual address V (which is not currently mapped to an aperture) thus generates a page fault.

FIG. 5C shows an example of modification of mappings depicted in FIG. 5B in response to a page fault associated with an access of virtual page 3 in the VA space 502. Note that in FIG. 5B, virtual page 3 is not mapped to an aperture in the PA space 506; as a result, an access of a virtual address in virtual page 3 results in a page fault that is handled by the OS.

In response to the foregoing page fault, a mapping is added between book aperture 2 and book block 3, as reflected by updating the PA-EA mapping 509 of FIG. 5B to form the modified PA-EA mapping 509A of FIG. 5C. This updating may be done by altering the entry of book mapping table 202 corresponding to book aperture 2. This change makes booklet block E (the booklet which virtual page 3 is supposed to be mapped to according to VA-EA mapping 503) accessible via the first half of book aperture 2. In this example, a free aperture (that is, one not currently mapped to a block) was available to make the booklet block (E) accessible. Further below, an example is provided where this is not the case.

Next, a mapping is added between virtual page 3 and the first half of book aperture 2. This added mapping is reflected by modifying the VA-PA mapping table 507 of FIG. 5B, forming modified VA-PA mapping table 507A as shown in FIG. 5C.

In the foregoing example, a book aperture is used to make booklet E accessible. An alternative example could instead have used a booklet aperture. In an alternative example (not shown), in response to the foregoing page fault, a mapping is added between booklet aperture B and booklet block E of book block 3, as reflected by modifying the PA-EA mapping 509 of FIG. 5B to form a modified PA-EA mapping. Then a mapping is added between virtual page 3 and booklet aperture B. This added mapping is reflected by modifying the VA-PA mapping table 507 of FIG. 5B, forming a modified VA-PA mapping table.

As noted above, at any given time, due to physical address space constraints of the processor 102, only so many extended pages (each extended page corresponding to a book block or booklet block of the EA space 504) can be paged into the PA space 506. If a page fault occurs and there are no free apertures (alternatively, the number of extended pages that have been paged in has reached a specified cap), then the OS, in response to a page fault, has to first free an aperture (which has the effect of paging out an extended page) before the OS can page in a different extended page.

Figure 5D:
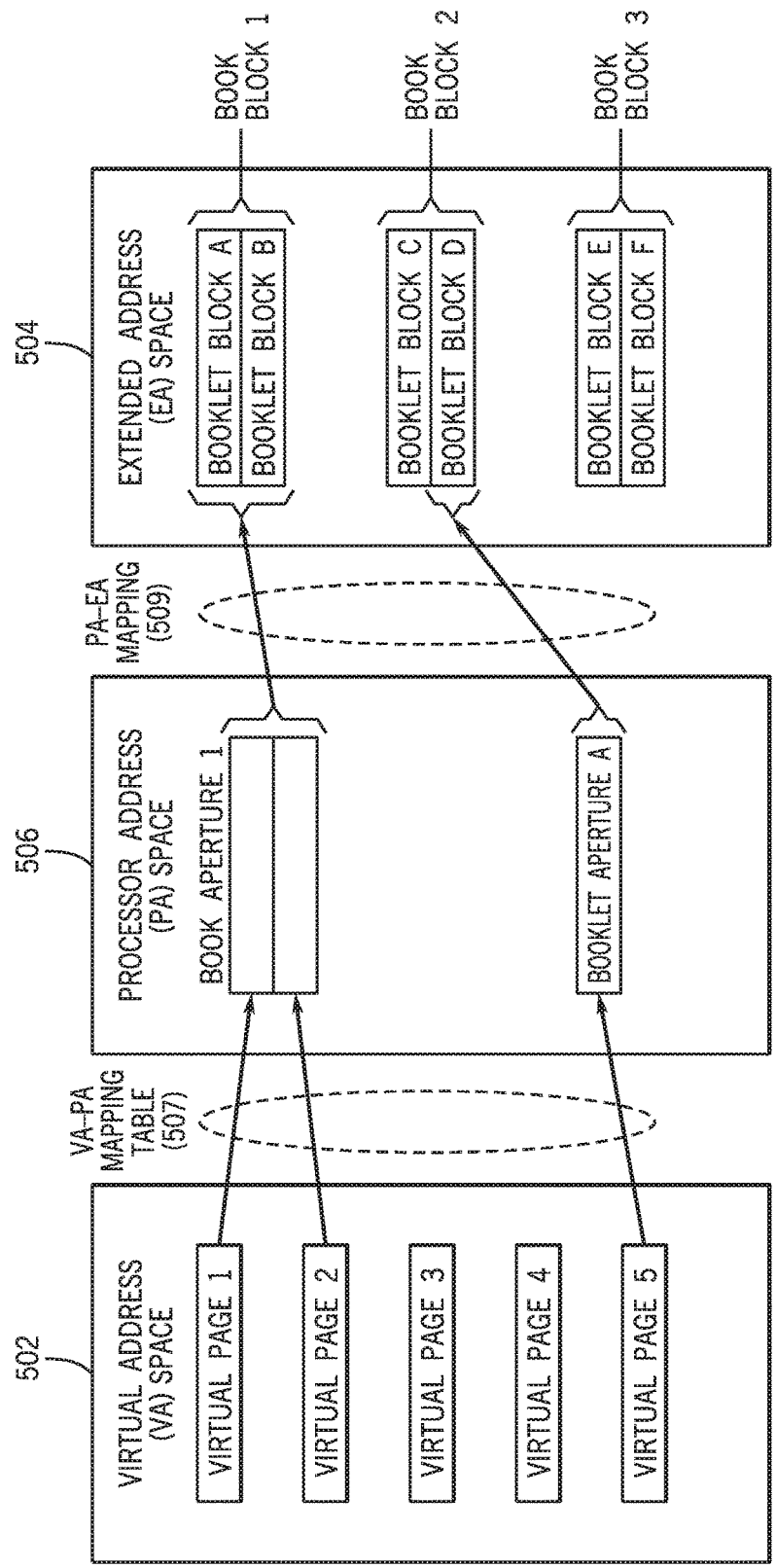

As an example, consider FIG. 5D, which is a modified version of FIG. 5B without book aperture 2 and booklet aperture B. Suppose the processor 102 attempts to access virtual page 3 in the example of FIG. 5D. The OS has to page in booklet block E but there are no free apertures. The OS has to choose an aperture to free. For this example, assume it chooses booklet aperture A; freeing booklet aperture A will have the effect of paging out booklet block D.

Freeing an aperture can include multiple tasks. First, the OS ensures that no virtual page maps to that aperture (in this example booklet aperture A) or any part of that aperture. In the FIG. 5D example, virtual page 5 is the only such virtual page that maps to aperture A, but in general there may be many such virtual pages, including from the virtual address spaces of other processes. To remove the mapping, the OS alters the VA-PA mapping table 507 of FIG. 5D (to form VA-PA mapping table 507B in FIG. 5E) to make virtual page 5 no longer mapped to any physical address (a process referred to as VA-PA un-mapping). This means that any future access to virtual page 5 will cause a page fault.

At this point (after the VA-PA un-mapping has been performed), no process can generate new accesses for the physical address range of aperture A. For the second task, the OS may flush and invalidate the cache lines (in cache memory) associated with the physical address range of aperture A; this ensures that no pending accesses to the physical address range of the aperture A remain. In some implementations, the flushing of cache lines can be performed by machine-readable instructions rather than by hardware. In other implementations, the flushing of cache lines can be performed by a hardware accelerator. In some implementations, flushing a range of cache lines may take time proportional to the size of the physical address range being flushed; this may make freeing book apertures much slower than freeing booklet apertures.

Figure 5E:
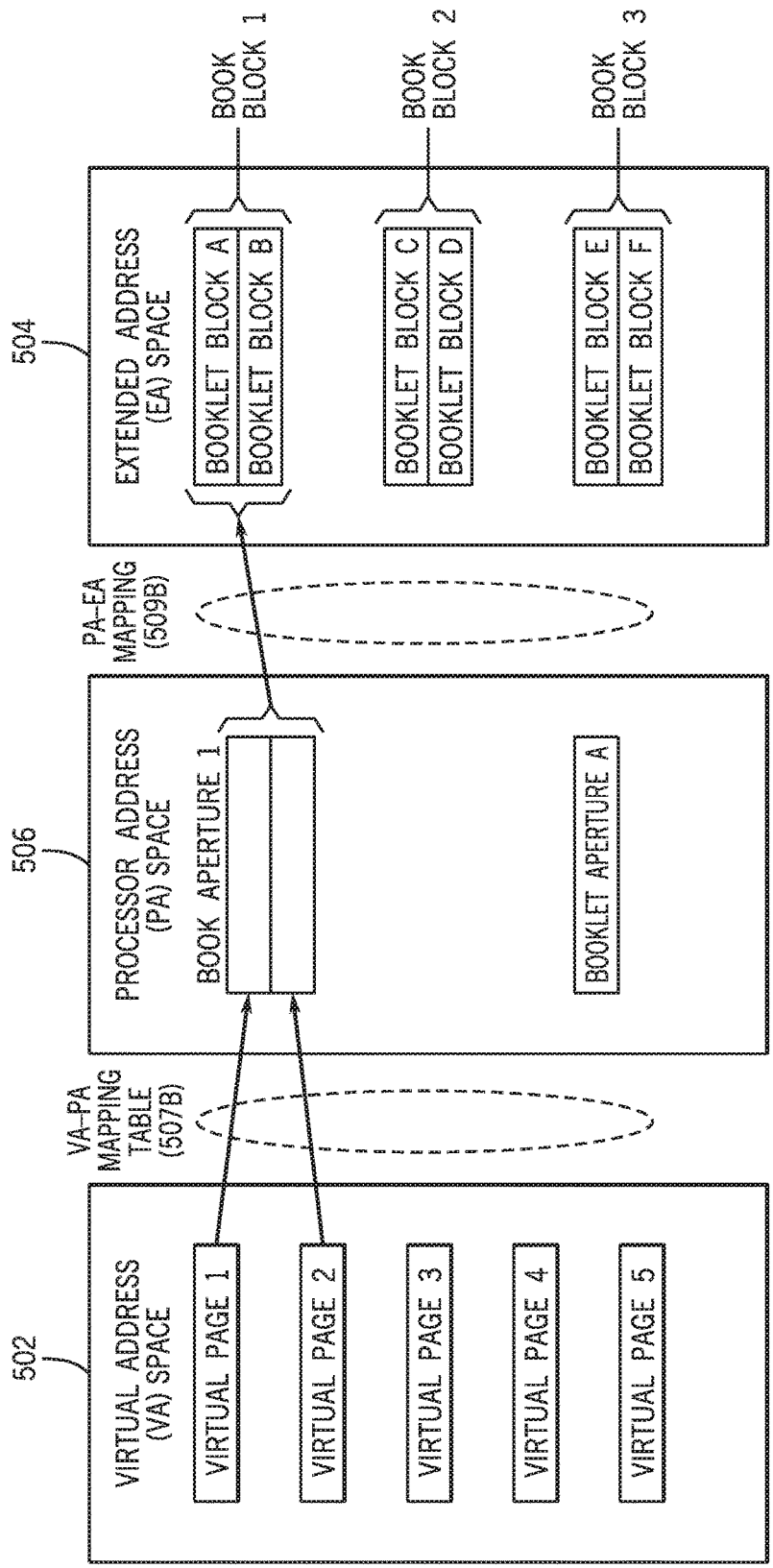

After performing the un-mapping discussed above, as a third task, the PA-EA mapping 509 of FIG. 5D is updated to remove the mapping between booklet aperture A and booklet block D, to provide updated PA-EA mapping 509B in FIG. 5E. At this point, the OS has finished freeing booklet aperture A and aperture A is ready for use to page in new extended pages.

Figure 5F:
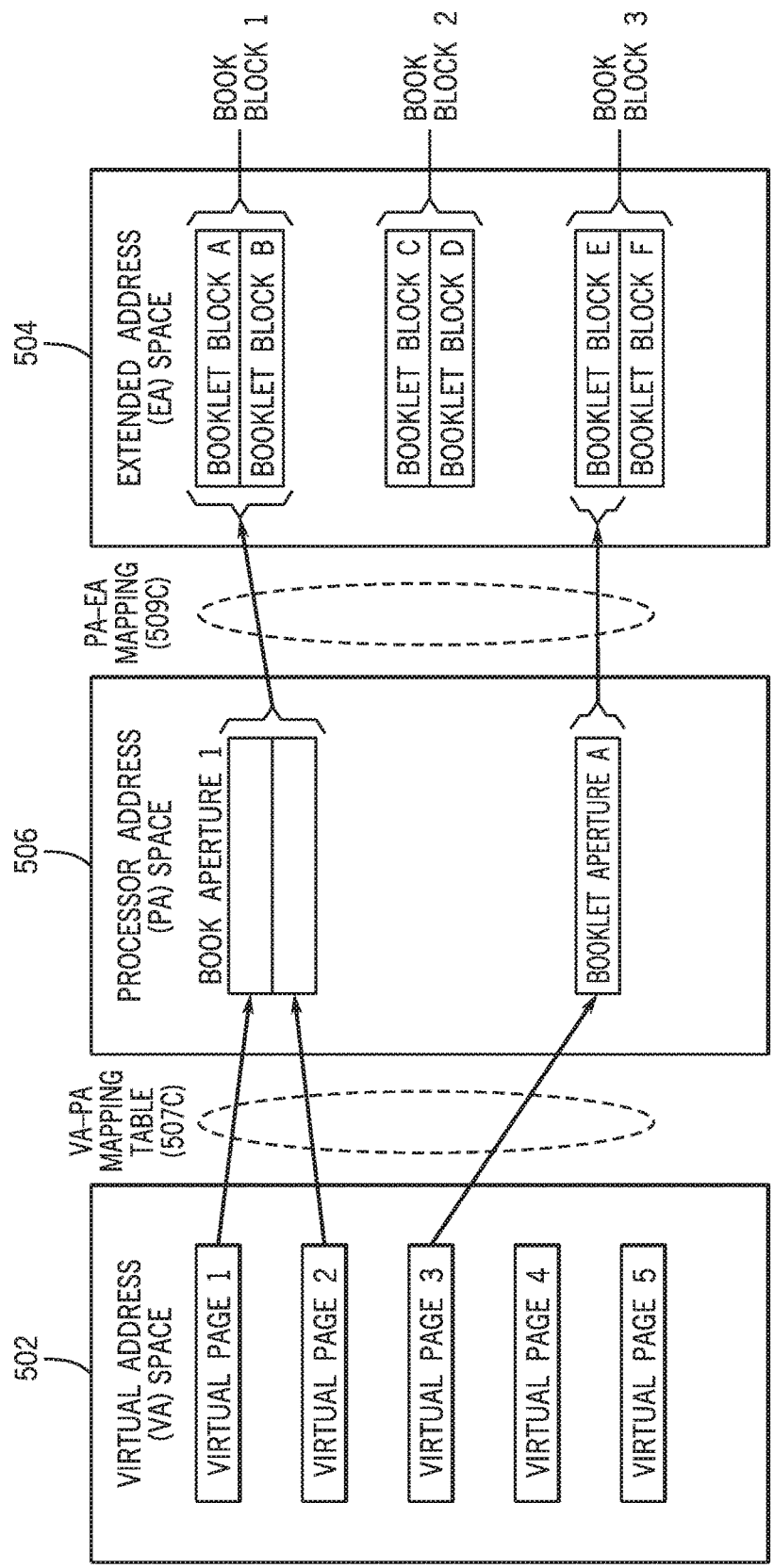

The rest of the example proceeds similarly to the previous example where booklet aperture B is used: a mapping is added between booklet aperture A and booklet block E of book block 3, as reflected by modifying the PA-EA mapping 509B (FIG. 5E) to form a modified PA-EA mapping 509C (FIG. 5F). Then a mapping is added between virtual page 3 and booklet aperture A. This added mapping is reflected by modifying the VA-PA mapping table 507B (FIG. 5E), forming a modified VA-PA mapping table 507C (FIG. 5F). These updates effectively map virtual page 3 to booklet block E in accordance with VA-EA table 503. The OS can return from the page fault and the operation can proceed with the access of a virtual address in virtual page 3.

The OS can decide whether to page in an entire book block or a booklet block. Generally, the OS can use booklet blocks when accesses are likely to be local and temporary (e.g., walking a random graph) and book blocks otherwise. More generally, the OS can determine a characteristic of data access associated with the access of a given virtual address. Based on the determined characteristic, the OS can select to access a given block including data for the access of the given virtual address using an aperture of the first size or one or multiple apertures of the second size.

In some examples, a program can specify whether book apertures or booklet apertures are to be used for respective pieces of the EA space 504.

In some examples, the OS may ensure that no two apertures point to extended memory blocks that overlap. This includes ensuring that booklet apertures do not point to booklet blocks that are contained in or overlap with book blocks currently pointed to by book apertures. The OS may have to switch between book apertures and booklet apertures at times (e.g., if the OS wants to page in a given book block and some of the booklet blocks of the given book block are already paged in, then the OS can either page in more of the booklet blocks of the given block 116, or alternatively, the OS can first page out the booklet blocks of the given book block, followed by paging in the entire given book block).

The OS could also control access of the book mapping table 202 and booklet mapping table 204 of FIG. 2 such that the tables 202 and 204 are only writable by the OS (or other authorized entity), to prevent user code or other unauthorized entities from attempting to access extended memory that they are not allowed to access.

In further implementations, the sizes of the book and booklet apertures can be dynamically changed by a system, such as by the OS or other code. In addition, the OS or other code can choose at runtime how many of the available apertures are book apertures and how many of the available apertures are booklet apertures.

Although the foregoing describes examples where an aperture maps directly to a range of extended memory, in further examples, the destination of a mapping may be something more complicated, such as mirrored memory (e.g., two blocks in extended memory contain identical data to provide fault tolerance). In such a case, the book mapping table 202 and/or the booklet mapping table 204 can contain more or different information, such as two block addresses in the case of mirrored memory. The book mapping table 202 and/or the booklet mapping table 204 can also contain other information relevant to accesses of the associated extended memory; for example, they may contain information about the priority of those accesses.

Various entities discussed above, such as the storage medium access control engine 206 and the OS, can be implemented as machine-readable instructions that are executable by at least one hardware processor.

The machine-readable instructions can be stored in non-transitory machine-readable or computer-readable storage media, which can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   mapping, by a controller based on first mapping information, apertures each of a first size in a first physical address space of a processor to respective blocks each of the first size in a second address space of a storage medium, the first mapping information comprising a plurality of entries, each entry of the first mapping information mapping a corresponding aperture of the first size to a corresponding block of the first size;

mapping, by the controller based on second mapping information, apertures each of a second size in the first physical address space to respective blocks each of the second size in the second address space, the second size being different from the first size, the second mapping information comprising a plurality of entries, each entry of the second mapping information mapping a corresponding aperture of the second size to a corresponding block of the second size;

receiving, by the controller from the processor, an access request to access a first address;

in response to determining that the first address corresponds to a first aperture of the first size, determining, by the controller, an address in a first block of the first size by accessing the mapping of the apertures of the first size to the respective blocks of the first size; and accessing, by the controller in response to the access request, the first block of the first size in the storage medium.

2. The method of claim 1, further comprising:
storing the first mapping information and the second mapping information,
wherein each respective entry of the entries of the first and second mapping information is indexed by a respective aperture identifier that identifies a corresponding aperture, and the respective entry indicates a block in the second address space to which the corresponding aperture is mapped.

3. The method of claim 1, wherein the first size is multiple orders of magnitude larger than the second size.

4. The method of claim 1, wherein the first size is at least one gigabyte, and the second size is a size of a virtual page.

5. The method of claim 1, further comprising:
changing the mapping of the apertures of the first size less frequently than the mapping of the apertures of the second size.

6. The method of claim 1, further comprising:
paging into the first physical address space of the processor a first subset of the blocks of the first size or the second size, the blocks of the first subset of blocks accessible using respective apertures of the first size or second size.

7. The method of claim 6, wherein a set of virtual addresses are mapped using a first mapping to a second subset of the blocks, the first mapping corresponding to a second mapping that maps a subset of the virtual addresses in the set to a subset of the respective apertures at any one time, the method further comprising:
detecting, by an operating system, a page fault in response to an access of a first virtual address that is not currently mapped to an aperture;
in response to the page fault,
selecting a block of the first subset of blocks to page out,
un-mapping in the second mapping virtual addresses that map to a first aperture currently mapped to the selected block,
remapping the first aperture to a particular block that the first virtual address is mapped to via the first mapping.

8. The method of claim 7, further comprising:
flushing cache lines associated with the first aperture using machine-readable instructions executed on the processor.

9. The method of claim 1, further comprising:
determining a characteristic of data access associated with an access of a first virtual address; and based on the determined characteristic, selecting to access a block including data for the access of the first virtual address using an aperture of the first size or an aperture of the second size.

10. The method of claim 1, wherein each block of the first size includes a plurality of the blocks of the second size.

11. A system comprising:
a storage medium associated with a storage medium address space;
a processor associated with a processor physical address space; and
a controller to:
map, based on first mapping information, apertures each of a first size in the processor physical address space to respective blocks each of the first size in the storage medium address space, the first mapping information comprising a plurality of entries, each entry of the first mapping information mapping a corresponding aperture of the first size to a corresponding block of the first size;
map, based on second mapping information, apertures each of a second size in the processor physical address space to respective blocks each of the second size in the storage medium address space, the second size being different from the first size, the second mapping information comprising a plurality of entries, each entry of the second mapping information mapping a corresponding aperture of the second size to a corresponding block of the second size;
receive a request from the processor to access a given address in the processor physical address space;
determine whether the given address corresponds to an aperture of the first size in the processor physical address space or to an aperture of the second size in the processor physical address space;
in response to determining that the given address corresponds to the aperture of the first size, determine an address in a first block of the first size mapped to the aperture of the first size, the first block of the first size being in the storage medium address space;
in response to determining that the given address corresponds to the aperture of the second size, determine an address in a second block of the second size mapped to the aperture of the second size, the second block of the second size being in the storage medium address space; and
access the first block or the second block in response to the request.

12. The system of claim 11, further comprising storage to store the first mapping information and the second mapping information, wherein the determining of the address in the first block or the second block is based on accessing the first mapping information or the second mapping information.

13. The system of claim 11, further comprising code executable by the processor to, at runtime of the system, change the first size or the second size.

14. The system of claim 11, further comprising code executable by the processor to, at runtime of the system, change a number of apertures of the first size or a number of apertures of the second size.

15. The system of claim 11, wherein each block of the first size includes a plurality of the blocks of the second size.

16. A controller to control access of a storage medium associated with a storage medium address space, the controller comprising:

a storage medium access control engine to:
- receive a request to access a given address in a processor physical address space;
- determine whether the given address corresponds to an aperture of a first size in the processor physical address space or to an aperture of a second size different from the first size in the processor physical address space;
- in response to determining that the given address corresponds to the aperture of the first size, determine an address in a first block of the first size in the storage medium address space by accessing a first mapping information comprising a plurality of entries that map apertures each of the first size in the processor physical address space to blocks each of the first size in the storage medium address space;
- in response to determining that the given address corresponds to the aperture of the second size, determine an address in a second block of the second size in the storage medium address space by accessing a second mapping information comprising a plurality of entries that map apertures each of the second size in the processor physical address space to blocks each of the second size in the storage medium address space; and
- access the first block or the second block in response to the request.

17. The controller of claim 16, wherein the second size is less than or equal to 1 megabyte and the first size is greater than or equal to 1 gigabyte.

18. The controller of claim 16, wherein each block of the first size includes a plurality of the blocks of the second size.

\* \* \* \* \*